United States Patent
Zhao

(10) Patent No.: US 7,546,270 B1
(45) Date of Patent: Jun. 9, 2009

(54) METHOD AND SYSTEM FOR ESTIMATING ECONOMIC RISK ASSOCIATED WITH A GROUP OF LOANS

(75) Inventor: Caijiao J. Zhao, Ellicott City, MD (US)

(73) Assignee: Fannie Mae, Washington, DC (US)

( * ) Notice: Subject to any disclaimer, the term of this patent is extended or adjusted under 35 U.S.C. 154(b) by 568 days.

(21) Appl. No.: 11/138,081

(22) Filed: May 25, 2005

Related U.S. Application Data

(60) Provisional application No. 60/574,619, filed on May 26, 2004.

(51) Int. Cl.
*G06Q 40/00* (2006.01)
(52) U.S. Cl. .......................... 705/38; 705/36 R; 705/37
(58) Field of Classification Search .................... 705/38
See application file for complete search history.

(56) References Cited

U.S. PATENT DOCUMENTS

| | | | |
|---|---|---|---|
| 6,988,082 B1 * | 1/2006 | Williams et al. ............ 705/36 T |
| 7,236,952 B1 * | 6/2007 | D'Zmura ................... 705/36 R |
| 2003/0115125 A1 * | 6/2003 | Lee et al. ...................... 705/36 |
| 2003/0225659 A1 * | 12/2003 | Breeden et al. ............... 705/36 |
| 2007/0027698 A1 * | 2/2007 | Daul et al. ...................... 705/1 |

OTHER PUBLICATIONS

Dependence structure and risk measure Thierry Ane, Cecile Kharoubi. The Journal of Business. Chicago: Jul. 2003. vol. 76, Iss. 3.*
Copula Sensitivity in Collateralized Debt Obligations and Basket Default Swaps Davide Meneguzzo, Walter Vecchiato. The Journal of Futures Markets. Hoboken: Jan. 2004. vol. 24, Iss. 1.*
Copulas: an open field for risk management Mar. 23, 2001.*
Measuring and Optimizing Portfolio Credit Risk: A Copula-based Approach Annalisa Di Clemente—Claudio Romano.*
Bouye et al., "Copulas: an open field for risk management," Mar. 23, 2001, 11 pages.
Ané Thierry, Kharoubi Cécile; Dependence Structure and Risk Measure; The Journal of Business; Jul. 2003; pp. 30; vol. 76, No. 3; The University of Chicago; USA.
Frey Rüdiger, McNeil Alexander J., Nyfeler Mark A.; Copulas and Credit Models; Oct. 2001; pp. 8, Switzerland.
Cherubini Umberto, Luciano Elisa; Pricing and Hedging Vulnerable Credit Derivatives with Copulas; Sep. 2002; pp. 25, Italy.
Li David X; On Default Correlation: A Copula Function Approach; Journal of Fixed Income; Mar. 2000; pp. 14; New York, USA.

* cited by examiner

*Primary Examiner*—Daniel S Felten
*Assistant Examiner*—William E Rankins
(74) *Attorney, Agent, or Firm*—Foley & Lardner LLP

(57) ABSTRACT

A method and system which may be used to estimate the economic risk associated with a group of loans by determining a set of values of a first variable associated with a group of loans using a mathematical Gaussian copula function is disclosed. The described method includes determining a statistical dependency structure based on a Gaussian copula function between a predetermined first distribution of values of a second variable associated with the group of loans and a predetermined second distribution of values of the second variable associated with the group of loans, determining the set of values of the first variable using the statistical dependency structure, and estimating the economic risk associated with the group of loans based on the set of values of the first variable associate with the group of loans.

23 Claims, 7 Drawing Sheets

METHOD AND SYSTEM FOR ESTIMATING ECONOMIC RISK ASSOCIATED WITH A GROUP OF LOANS

CROSS-REFERENCE TO RELATED APPLICATIONS

This application claims the benefit of U.S. Provisional Application No. 60/574,619, filed May 26, 2004 and entitled "Method and System for Estimating Economic Risk Associated With a Group of Loans," the entire content of which is hereby incorporated by reference.

BACKGROUND

The present invention relates generally to methods and systems used to process data pertaining to financial assets, such as loans, securities, and so forth. More particularly, the present invention relates to a method and system for estimating economic risk associated with a group of loans by determining future loan capital reserve requirements or other variables related to a group of loans using a mathematical Gaussian copula function.

In assessing and managing risks associated with a group of loans or other financial assets, it is often desirable to compute one or more variables associated with the group of loans. For example, in the secondary mortgage market, a mortgage investor may wish to compute such variables as initial and future loan capital reserve requirements. A capital reserve requirement is the amount of risk-free assets needed to be set aside to cover potential income shortfalls associated with a group of loans for a particular time period within a given probability. For example, the capital reserve requirement may be the amount of economic capital required to sustain a "stress loss" of 99.5% of cumulative losses associated with the pool of loans over a given 10-year period.

Computing such variables may often involve, for example, running a number of computer simulations based on one or more mathematical economic models or other associated equations to generate a number of statistical data paths (i.e., economic scenarios) representative of a range of projected economic conditions for a given time period. The statistical data paths may then be used to estimate a statistical distribution of one or more variables associated with the group of loans. These distributions may in turn be used to calculate further variables associated with the group of loans. For example, a mortgage investor may wish to determine the amount of economic capital required to sustain a stress loss of 99.5% of cumulative losses associated with a group of loans over an initial 10-year period by first simulating a number (e.g., 1000) of statistical data paths representing a range of projected economic conditions over a 10-year period, such as house price and interest rate paths based on predetermined mathematical house price or interest rate models. The mortgage investor may then further calculate one or more variables associated with the group of loans, such as, for example, periodic and cumulative default rate, prepayment rate, and severity of default, for each of the 1000 statistical data paths based on corresponding predetermined mathematical equations, and use these calculations to obtain statistical distributions pertaining to, for example, periodic and cumulative losses and unpaid loan balances. Given these distributions, the data path representing the worst 99.5% loss scenario (i.e., the "stress path") may be determined, and economic capital reserve requirements may then be computed for the initial 10-year period.

The mortgage investor may then wish to further determine future loan capital reserve requirements for a subsequent time period, such as a 10-year period spanning years 2-11. However, due to changing economic conditions (e.g., increasing or decreasing house prices and interest rates) over time, using the original stress path may overstate or understate future loan capital reserve requirements for years 2-11, leading to inaccurate or inefficient assessment and management of the group of loans. To account for these changes, a new set of 1000 statistical data paths representative of projected economic conditions for years 2-11 could be generated for each of the original statistical data paths from which new parameter values could be calculated, and a new stress path could be determined from each of the 1000 new sets of 1000 simulations for each of the statistical data paths. A new loan capital reserve requirement could then be determined for years 2-11 that is dependent upon the first year economic conditions in each path while taking into account potential changes in economic conditions in the future. However, generating a new set of simulations for each of the original statistical data paths and calculating new variables for each new set of statistical data paths may be computationally infeasible for calculating changes in loan capital reserve requirements over time where significantly large loan portfolios or complex mathematical equations or models are involved, or where large numbers of simulations are necessary in order to maintain accuracy. Thus, there is a need for an improved method and system for estimating economic risk associated with a group of loans.

SUMMARY

According to a first exemplary embodiment, a method for estimating economic risk associated with a group of loans according to a set of values of a first variable associated with the group of loans, wherein the first variable corresponds to a predetermined time period during the pendency of the group of loans, includes determining a statistical dependency structure between a predetermined first distribution of values of a second variable associated with the group of loans and a predetermined second distribution of values of the second variable associated with the group of loans, wherein the statistical dependency structure is based on a Gaussian copula function; determining the set of values of the first variable using the statistical dependency structure; and estimating the economic risk associated with the group of loans based on the set of values of the first variable associate with the group of loans.

According to a second exemplary embodiment, a computer implemented method for determining a set of future capital reserve requirements for the group of mortgage loans using a number of predetermined data paths representative of projected economic conditions during the pendency of the group of mortgage loans, wherein the set of future capital reserve requirements corresponds to a predetermined time period during the pendency of the group of mortgage loans, includes determining a statistical dependency structure between first and second distributions of net cash flow values based on a Gaussian copula function, the first distribution comprising individual net cash flow values corresponding to each predetermined data path at a first time prior to the predetermined time period, and the second distribution comprising individual net cash flow values corresponding to each predetermined data path at a second time after the predetermined time period; and determining the set of future capital reserve requirements from the statistical dependency structure.

According to a third exemplary embodiment, a system for determining a set of values of a first variable associated with a group of loans, wherein the set of values of the first variable corresponds to a predetermined time period during the pendency of the group of loans, includes memory including a predetermined first distribution of values of a second variable associated with the group of loans and a predetermined second distribution of values of the second variable associated with the group of loans; and a processor coupled to the memory and operable to execute programmed instructions, wherein the programmed instructions determine a statistical dependency structure between the predetermined first distribution of values of the second variable associated with the group of loans and the predetermined second distribution of values of the second variable associated with the group of loans, wherein the statistical dependency structure is based on a Gaussian copula function; and determine the set of values of the first variable using the statistical dependency structure, whereby economic risk associated with the group of loans may be estimated based on the set of values of the first variable.

DETAILED DESCRIPTION

Figure 1:
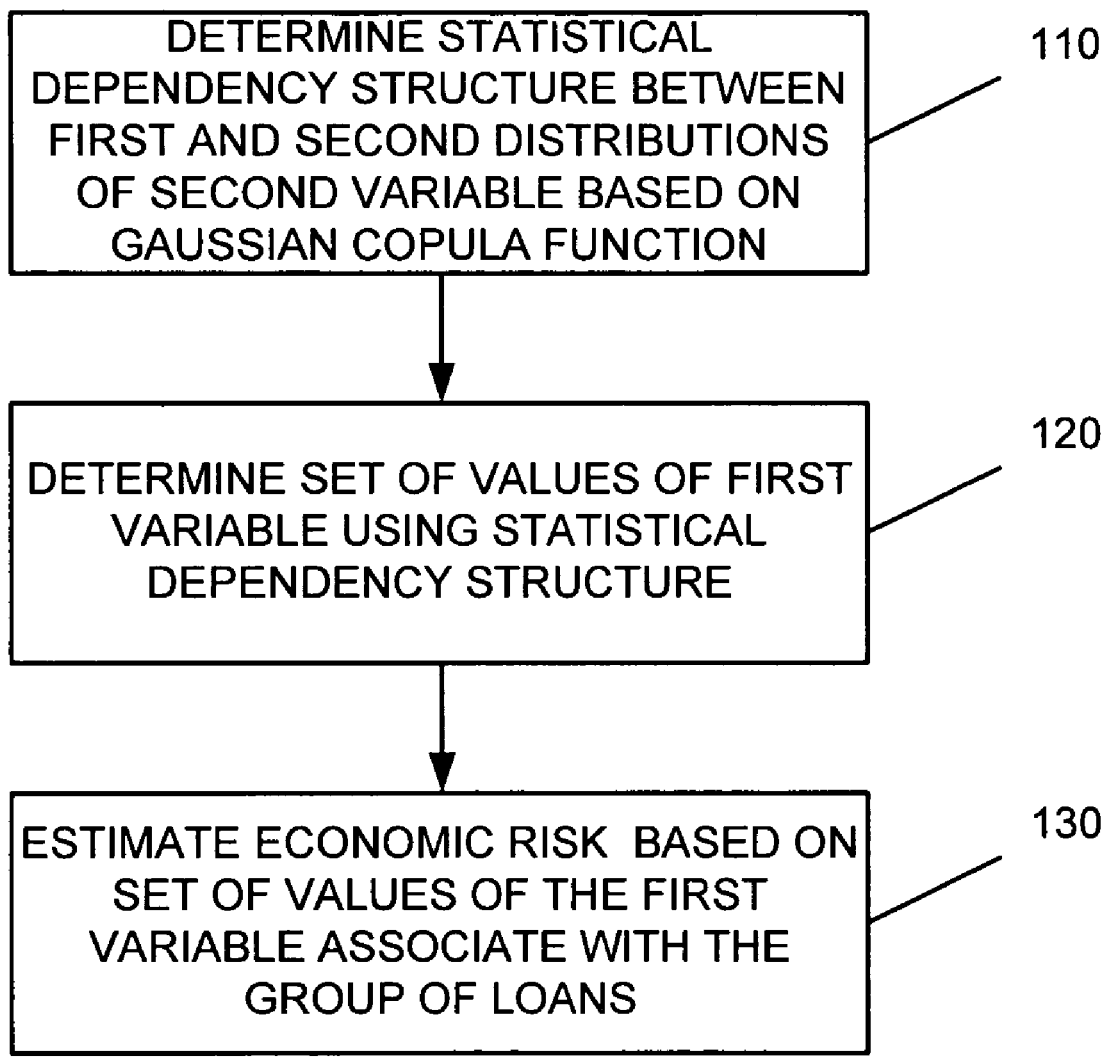
FIG. 1 is a flow diagram depicting a method for estimating economic risk associated with a group of loans according to an exemplary embodiment.

Turning now to the FIGURES which illustrate exemplary embodiments, a method and system are shown which may be used to estimate the economic risk associated with a group of loans by determining future capital reserve requirements or other variables associated with a group of loans using a mathematical Gaussian copula function. Capital reserve requirements and guaranty fees are two examples of variables associated with a group of loans that may be used as an appropriate measure of economic risk associated with the group of loans. As stated above, a capital reserve requirement is the amount of risk-free assets needed to be set aside to cover potential income shortfalls associated with a group of loans for a particular time period within a given probability. Guaranty fees are fees charged in return for a guaranty of timely payment of interest and principal to the purchaser of a security backed by a particular group of loans. In the illustrated embodiment, a set of values of a first variable (e.g., future capital reserve requirement, guaranty fee, etc.) associated with a group of loans and corresponding to a predetermined time period during the pendency of the group of loans may be determined for a number of predetermined statistical data paths representative of projected economic conditions during the pendency of the group of loans. In order to calculate the set of values of the first variable, a statistical dependency structure based on a mathematical Gaussian copula function may be determined between first and second distributions of a second variable associated with the group of loans which are calculated for each predetermined statistical data path at a point in time before and a point in time after the predetermined time period corresponding to the first variable. The statistical dependency structure may then be used to determine the probability that each particular value in the second distribution will result, given each particular value in the first distribution. These probabilities may then be used to determine for each individual value in the first distribution one of the existing data paths from which to calculate a value of the first variable for the predetermined time period. In this way, an individual value of the first variable corresponding to the predetermined time period may be calculated for each of the predetermined data paths based on any of the other predetermined data paths. Thus, the method and system achieves computational advantages by reducing the number of simulations required to determine values of the first variable that are more accurate and more consistent with both past and potential future economic conditions. In turn, these variable values provide for more accurate and efficient estimation of the risks associated with the group of loans or other financial assets.

The present description is generally provided in the context of estimating the risk associated with a group of loans by determining a set of values of a future capital reserve requirement or other variable associated with a group of loans or other financial assets using a mathematical Gaussian copula function. Although the present description is provided primarily in the context of future capital reserve requirements for mortgage loans, it should be understood that the methods and systems described and claimed herein may also be used in other contexts. For example, the first variable may include other variables such as a guaranty fee or the value of an option. Further, the systems and methods may be used in the context of all types of loans as well as financial assets other than loans to value the existing position of the asset over differing time periods. It should also be understood that a particular example or embodiment described herein may be combined with one or more other examples or embodiments also described herein to form various additional embodiments as would be recognized by those of ordinary skill. Accordingly, the systems and methods described herein may encompass various embodiments and permutations as may be appropriate and/or recognized by those of ordinary skill.

Referring now to FIG. 1, a method for estimating economic risk associated with a group of loans by determining a set of values of a first variable associated with a group of loans is shown. The first variable may be any desired variable associated with the group of loans. In a preferred embodiment, the first variable is a future capital reserve requirement which represents the amount of economic capital required to sustain a stress loss of 99.5% of cumulative losses associated with the group of loans over a given period of time. The first variable may also correspond to a predetermined time period T during the pendency of the group of loans. For example, in a preferred embodiment, the predetermined time period T may be a 10-year period during the pendency of a group of 30-year mortgage loans such that T represents a period of time covering years 2 to 11. Predetermined time period T may be expressed as any desire duration (e.g., weeks, months, years, etc.).

At step 110, a statistical dependency structure is determined between a predetermined first distribution of values of a second variable associated with the group of loans and a predetermined second distribution of values of the second variable associated with the group of loans. The second variable may be any variable associated with the group of loans which is relevant to determining the set of values of the first variable. Preferably, the second variable is chosen to capture as much information as possible regarding the first variable. For example, in a preferred embodiment, the second variable may be a net income associated with the group of loans and related to the future capital reserve requirement. Other examples of the second variable may include, for example, future and cumulative losses related to the group of loans. Hereinafter, the variable X will be used to generally denote the second variable.

Figure 2:
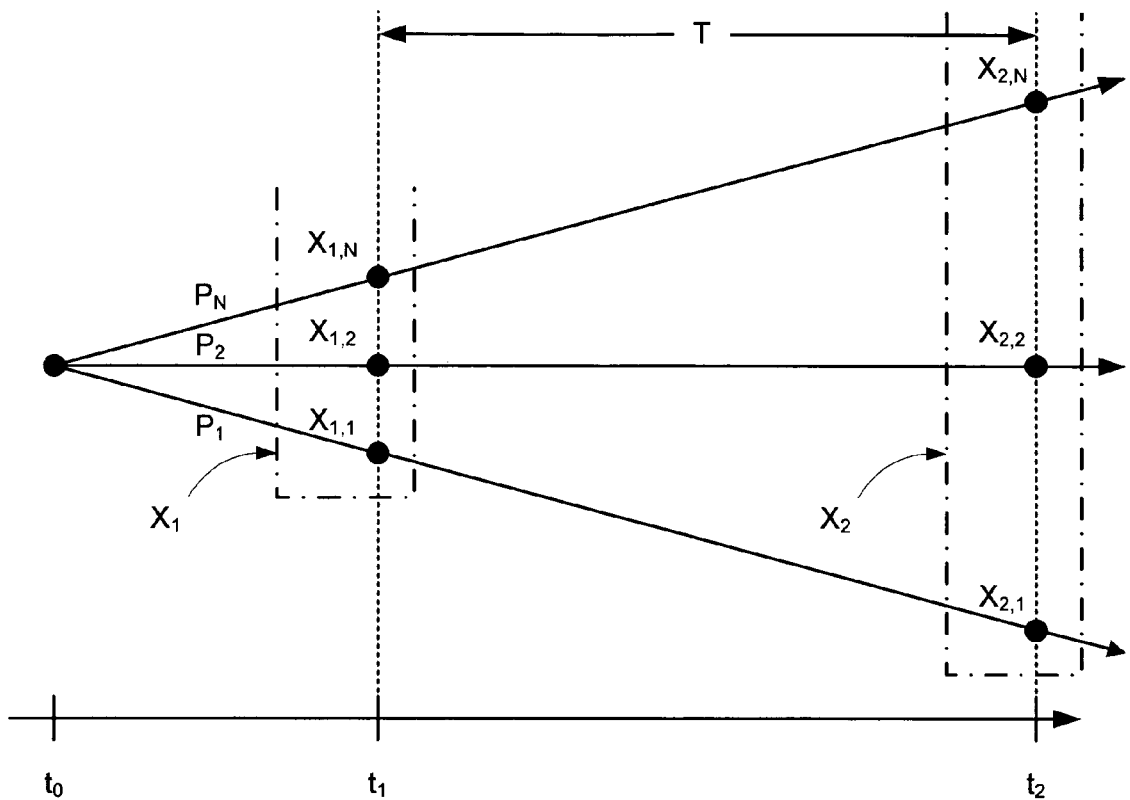
FIG. 2 is a diagram illustrating first and second distributions of a second variable associated with a group of loans according to an exemplary embodiment.

Referring now to FIG. 2, a diagram of the predetermined first and second distributions of the second variable is shown. The first and second distributions of the second variable are predetermined in the sense that they may be determined prior to implementing the described method as part of a larger operation which includes the described method, or determined as part of a separate operation. The first and second distributions may be generated prior to step 110 in the described method, for example, by performing a number of computer simulations based on one or more mathematical economic models or other associated equations to generate a number N of statistical data paths (i.e., economic scenarios) $P_i$ representative of a range of projected economic conditions during the pendency of a group of loans or other financial assets. Paths $P_1$, $P_2$, and $P_N$ are illustrated in FIG. 2 for reference. The statistical data paths may then be used to generate first and second statistical distributions $X_1$ and $X_2$ of second variable X associated with the group of loans. First and second distributions $X_1$ and $X_2$ may each contain a set of N values of the second variable, wherein each value corresponds to one of the N statistical data paths. Where there are N predetermined data paths, first distribution $X_1$ may be represented as $X_1 = \{X_{1,1}, X_{1,2}, \ldots, X_{1,N}\}$. Similarly, second distribution $X_2$ may be represented as $X_2 = \{X_{2,1}, X_{2,2}, \ldots, X_{2,N}\}$. $X_{1,1}$, $X_{1,2}$, and $X_{1,N}$ from $X_1$ and $X_{2,1}$, $X_{2,2}$, and $X_{2,N}$ from $X_2$ are illustrated in FIG. 2 for reference. Further, each of the values in first distribution $X_1$ may correspond to a point in time $t_1$ which occurs prior to the predetermined period of time T, and each of the values in second distribution $X_2$ may correspond to a point in time $t_2$ which occurs after the predetermined period of time T, as shown in FIG. 2.

Continuing with step 110, the statistical dependency structure defines the magnitude of the statistical dependence between first and second distributions $X_1$ and $X_2$ and may be based on a mathematical Gaussian copula function. As will be recognized by those of ordinary skill in the art, a mathematical copula function is a distribution function defined on the interval $[0,1]^2$ that joins any two continuous uniform marginal distributions to form a joint bivariate distribution. Mathematically, the copula function may be represented as $C(U_1, U_2) = Pr[U_1 \leq u_1, U_2 \leq u_2]$, where $U_1$ and $U_2$ are uniform on the interval of $[0,1]$. It will be further recognized that the copula function $C(U_1, U_2)$, as a joint distribution of uniform random variables $U_1$ and $U_2$ is invariant to any increasing and continuous transformation H of uniform marginal distributions $U_1$ and $U_2$. Using the invariance property of the copula function, it may be shown that where $X_1$ and $X_2$ have cumulative distribution functions $F_1$ and $F_2$, and where $Y_1 = H_1(X_1)$ and $Y_2 = H_2(X_2)$, and where $H_1$ and $H_2$ are any increasing transformation, the appropriate dependence structure for $(Y_1, Y_2)$ is also appropriate for $(X_1, X_2)$.

Figure 3:
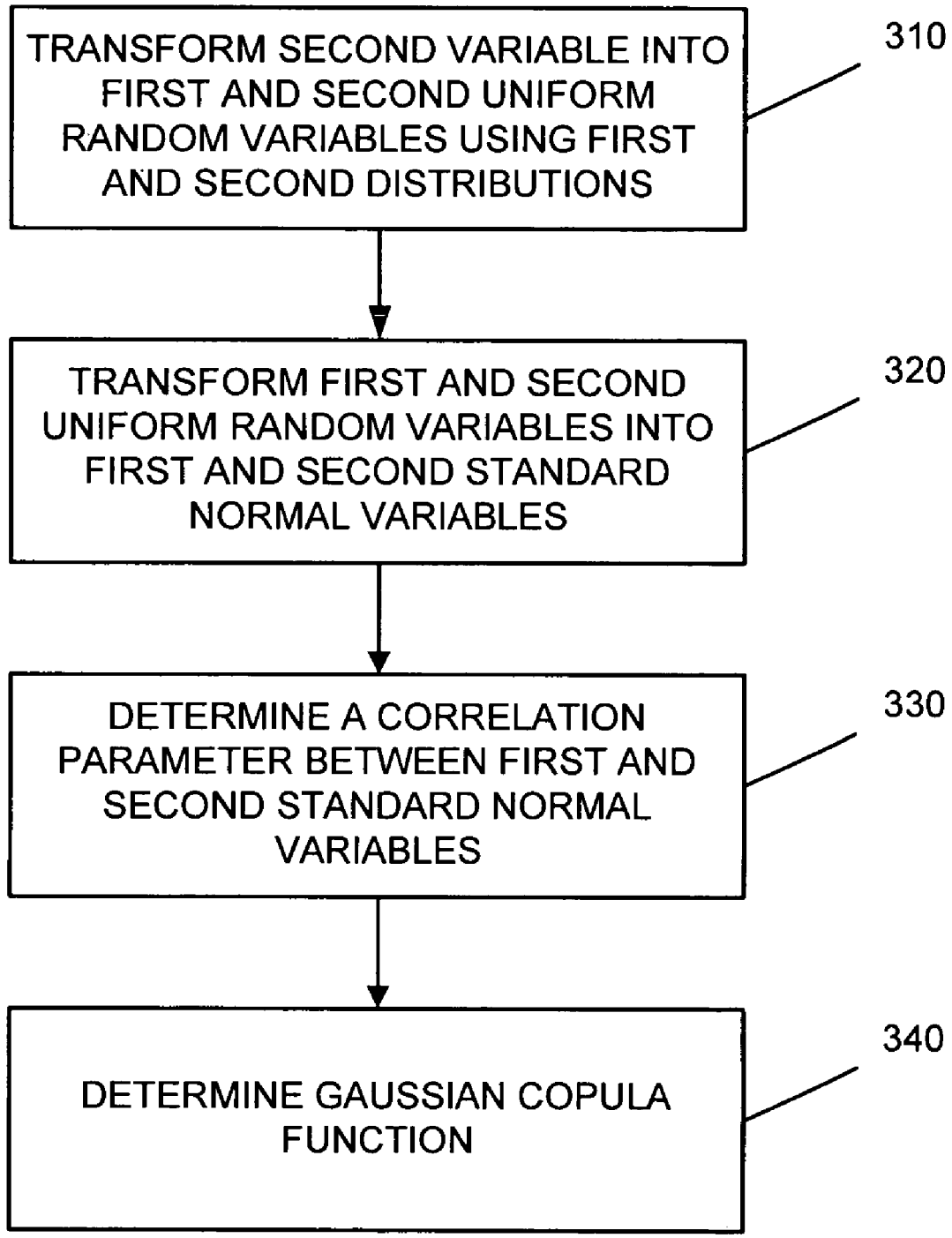
FIG. 3 is a flow diagram depicting a method for determining a statistical dependency structure between first and second distributions of a second variable associated with a group of loans based on a Gaussian copula function according to an exemplary embodiment.

Referring now to FIG. 3, a method for determining the statistical dependency structure between first and second distributions $X_1$ and $X_2$ based on a Gaussian copula function according to step 110 is shown. This method may be required, for example, where first and second distributions $X_1$ and $X_2$ of second variable X are not normally distributed. Applying the method shown in FIG. 3 transforms first and second distributions $X_1$ and $X_2$ into first and second standard normal variables $Y_1$ and $Y_2$ to which a Gaussian dependency structure can be applied. As may be understood, the use of a Gaussian dependency structure provides a convenient structure from which relevant probabilities may be determined. At step 310, second variable X may be transformed into first and second uniform random variables $U_1$ and $U_2$ using first and second distributions $X_1$ and $X_2$. This transformation H is both increasing and continuous and preserves the marginal distributions of $X_1$ and $X_2$. For example, first and second distributions $X_1$ and $X_2$ may be transformed into $U_1$ and $U_2$ according to transformation functions $H_1 = F_1$ and $H_2 = F_2$, where $F_1$ and $F_2$ may be empirical probability functions determined from histograms of the N individual values of X contained in $X_1$ and $X_2$, such that $U_1 = F_1(X_1)$ and $U_2 = F_2(X_2)$.

At step 320, first and second uniform random variables $U_1$ and $U_2$ may be transformed into first and second standard normal (i.e., Gaussian) variables $Y_1$ and $Y_2$ according to the transformation function $H_3 = \Phi^{-1}$, where $\Phi$ may be a univariate Gaussian distribution function. The transformation function $\Phi^{-1}$ is also an increasing and continuous function. Where $U_1 = F_1(X_1)$ and $U_2 = F_2(X_2)$, the Gaussian transformation results in first and second standard normal variables $Y_1$ and $Y_2$ which may be defined as $Y_1 = \Phi^{-1}(F_1(X_1)) = \Phi^{-1}(U_1)$ and $Y_2 = \Phi^{-1}(F_2(X_2)) = \Phi^{-1}(U_2)$.

At step 330, a correlation parameter $\rho$ may be determined between $Y_1$ and $Y_2$. Correlation parameter $\rho$ may be determined based on the assumption that the joint distribution for first and second standard normal variables $Y_1$ and $Y_2$ is a bivariate normal distribution. Accordingly, correlation parameter $\rho$ may be estimated from the N corresponding pairs of values of first and second standard normal variables $Y_1$ and $Y_2$, where each pair may be defined as $(Y_{1,k}, Y_{2,j})$ for $k=j=1, 2, \ldots, N$, and where correlation parameter $\rho$ may be the Pearson's linear correlation between first and second standard normal variables $Y_1$ and $Y_2$ according to:

$$\rho = Corr(Y_1, Y_2) = \frac{\frac{1}{N} \sum_{K=j=1}^{N} (Y_{1,k} - \overline{Y}_1)(Y_{2,j} - \overline{Y}_2)}{\frac{1}{N-1} \sqrt{\sum_{K=j=1}^{N} (Y_{1,k} - \overline{Y}_1)^2 \sum_{K=j=1}^{N} (Y_{2,j} - \overline{Y}_2)^2}} \quad (1)$$

At step 340, a Gaussian copula function defining the dependence structure between first and second standard normal variables $Y_1$ and $Y_2$ may be determined as a function of first and second standard normal variables $Y_1$ and $Y_2$, as well as correlation parameter $\rho$. The Gaussian copula function may be defined according to:

$$C(y_1, y_2) = Pr[Y_1 \leq y_1, Y_2 \leq y_2] = \quad (2)$$

-continued $$\int_{-\infty}^{y_1}\int_{-\infty}^{y_2}\frac{1}{2\pi\sqrt{1-\rho^2}}\exp\left\{-\frac{y_1^2-2\rho y_1 y_2+y_2^2}{2(1-\rho^2)}\right\}dy_1\,dy_2$$

Figure 4:
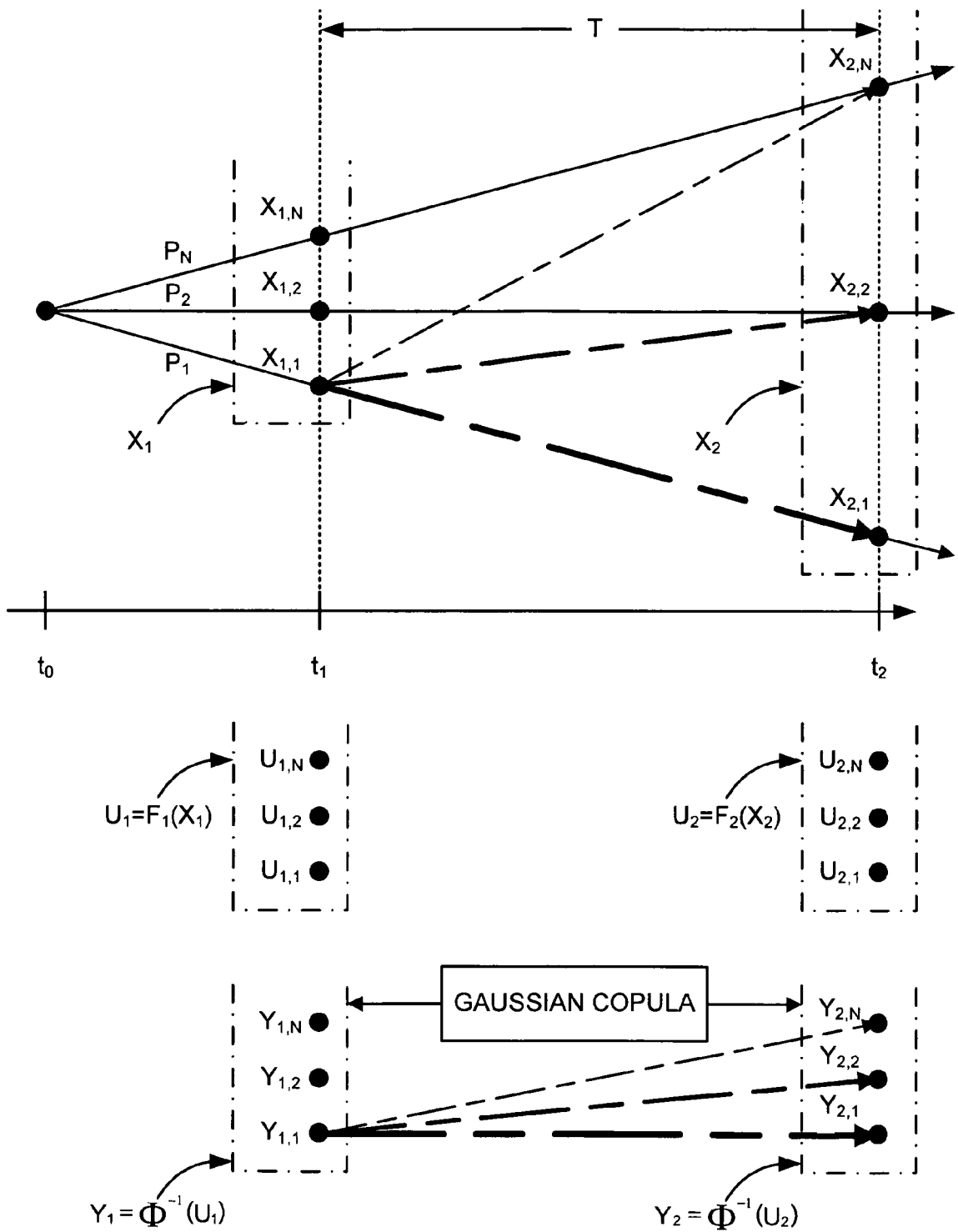
FIG. 4 is a diagram illustrating a variable transformation process according to an exemplary embodiment.

Referring now to FIG. 4, the relationship between first and second distributions $X_1$ and $X_2$, first and second uniform random variables $U_1$ and $U_2$, first and second standard normal variables $Y_1$ and $Y_2$, and the Gaussian copula function of Eq. (2) is shown. As may be understood, the joint normal distribution defined by the Gaussian copula function of Eq. (2) is only imposed on first and second standard normal variables $Y_1$ and $Y_2$, as shown in FIG. 4, and does not imply a joint normal distribution for first and second distributions $X_1$ and $X_2$ or in any way affect the marginal distributions of $X_1$ and $X_2$. However, although the joint normal distribution is not imposed on first and second distributions $X_1$ and $X_2$, it may be further understood that, in accordance with the invariance property of the Gaussian copula imposed on first and second standard normal variables $Y_1$ and $Y_2$, because the transformations of $X_1$ and $X_2$ to $Y_1$ and $Y_2$ in steps 210 and 220 are increasing and continuous transformations, the statistical dependency structure defined by the Gaussian copula function for $Y_1$ and $Y_2$ is also an appropriate dependency structure for $X_1$ and $X_2$. This is illustrated in FIG. 4 by the dashed lines between $Y_{1,1}$ and $Y_{2,1}$, $Y_{2,2}$ and $Y_{2,N}$ respectively, which indicate the dependence structure between $Y_1$ and $Y_2$; given $Y_{1,1}$. The weight of each dashed line represents the dependence magnitude. Similar dashed lines are shown in FIG. 4 between $X_{1,1}$ and $X_{2,1}$, $X_{2,2}$, and $X_{2,N}$ respectively to indicate the corresponding application of this dependence structure between $X_1$ and $X_2$.

Referring again to FIG. 1, at step 120 a set of values of the first variable may be determined using the statistical dependency structure defined by the Gaussian copula function in Eq. (2). More specifically, the statistical dependency structure defined by the Gaussian copula function of Eq. (2) may be used to determine the probability that each particular value in the second distribution $X_2$ will result, given a particular value $X_{1,k}$ in the first distribution $X_1$. These probabilities may then be used to determine for each individual value $X_{1,k}$ in the first distribution $X_1$ one of the predetermined statistical data paths $P_i$ from which to calculate a value of the first variable for predetermined time period T, where k is an indexing variable which denotes a particular value of $X_1$ along data path $P_{i=k}$ in the set of N statistical data paths. Accordingly, an individual value of the first variable corresponding to predetermined time period T may be calculated for each predetermined data path $P_{i=k}$ based on any of the other predetermined statistical data paths $P_i$.

Figure 5:
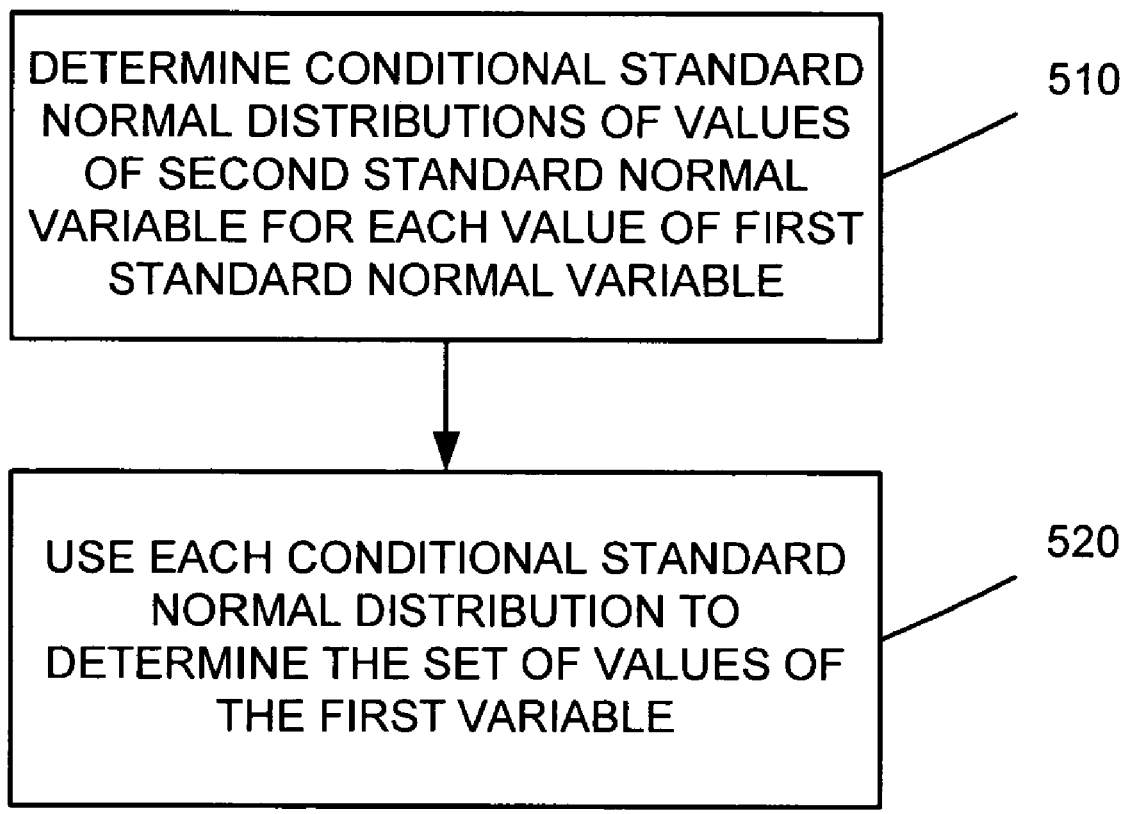
FIG. 5 is a flow diagram depicting the steps involved in determining a set of values of a first variable associated with a group of loans using a statistical dependency structure according to an exemplary embodiment.

Referring now to FIG. 5, the steps involved in step 120 to determine the set of values of the first variable associated with the group of loans using the statistical dependency structure are shown. At step 510, a conditional standard normal distribution of values of the second standard normal variable $Y_2$ may be calculated for each of the N values $Y_{1,k}$ of the first standard normal variable $Y_1$ using the Gaussian copula function of Eq. (2). Each conditional standard normal distribution represents the probability that a particular value of the second standard normal variable $Y_2$ will be realized given each value $Y_{1,k}$ of the first standard normal variable $Y_1$. Because first and second standard normal variables $Y_1$ and $Y_2$ have a bivariate standard normal distribution (i.e., a Gaussian distribution) with correlation parameter ρ, the distribution of second standard normal variable $Y_2$ conditional on a particular value $Y_{1,k}$ of first standard normal variable $Y_1$ is also normal and the probability of having any realization of second standard normal variable $Y_2$ conditional on a particular realization $Y_{1,k}$ of first standard normal variable $Y_1$ may be conveniently determined. Hereinafter, each conditional standard normal distribution of second standard normal variable $Y_2$ given a particular realization $Y_{1,k}$ of first standard normal variable $Y_1$ will be indicated by $Y_2|y_{1,k}$. Each of the N conditional standard normal distributions $Y_2|y_{1,k}$ will be normally distributed with conditional mean $E[Y_2|y_{1,k}]$ and conditional variance $Var[Y_2|y_{1,k}]$ according to:

$$Y_2|y_{1,k} \in N(E[Y_2|y_{1,k}], Var[Y_2|y_{1,k}]) \quad (4)$$

$$E[Y_2 \mid y_{1,k}] = E(Y_2) + \rho\frac{\sigma_{Y2}}{\sigma_{Y1}}[y_{1,k} - E(Y_1)] = \rho y_{1,k} \quad (5)$$

$$Var[Y_2|y_{1,k}](1-\rho^2)Var[Y_2]=1-\rho^2 \quad (6)$$

At step 520, each conditional standard normal distributions $Y_2|y_{1,k}$ may be used to determine the set of values of the first variable, wherein each individual value of the first variable corresponds to one of the N statistical data paths $P_{i=k}$. Because each of the conditional standard normal distributions $Y_2|y_{1,k}$ represents the probability of having any realization of $Y_2$ conditional on a particular realization $Y_{1,k}$ of $Y_1$, and because the transformations of first and second distributions $X_1$ and $X_2$ to first and second standard normal variables $Y_1$ and $Y_2$ in steps 210 and 220 are increasing and continuous transformations, the invariance property of the Gaussian copula function in Eq. (2) may be used to determine the probability of having any realization of a particular value in second distribution $X_2$ conditional on a particular realization $X_{1,k}$ in first distribution $X_1$. Accordingly, the probability of having any realization of $X_2$ conditional on a particular realization of $X_1$ is given by:

$$Pr\{X_2 = x_{2,j} \mid X_1 = x_{1,k}\} = \quad (7)$$

$$\frac{Pr\{X_2 = x_{2,j}, X_1 = x_{1,k}\}}{Pr\{X_1 = x_{1,k}\}} = \frac{Pr\{F_2(X_2) = F_2(x_{2,j}), F_1(X_1) = F_1(x_{1,k})\}}{Pr\{F_1(X_1) = F_1(x_{1,k})\}} =$$

$$\frac{Pr\{Y_2 = \Phi^{-1}[F_2(x_{2,j})], Y_1 = \Phi^{-1}[F_1(x_{1,k})]\}}{Pr\{Y_1 = \Phi^{-1}[F_1(x_{1,k})]\}} = \frac{Pr\{Y_2 = y_{2,j}, Y_1 = y_{1,k}\}}{Pr\{Y_1 = y_{1,k}\}}$$

In Eq. (7), k is used to index the N values in $X_1$ and $Y_1$, while j is used to separately index the N values in $X_2$ and $Y_2$.

Figure 6:
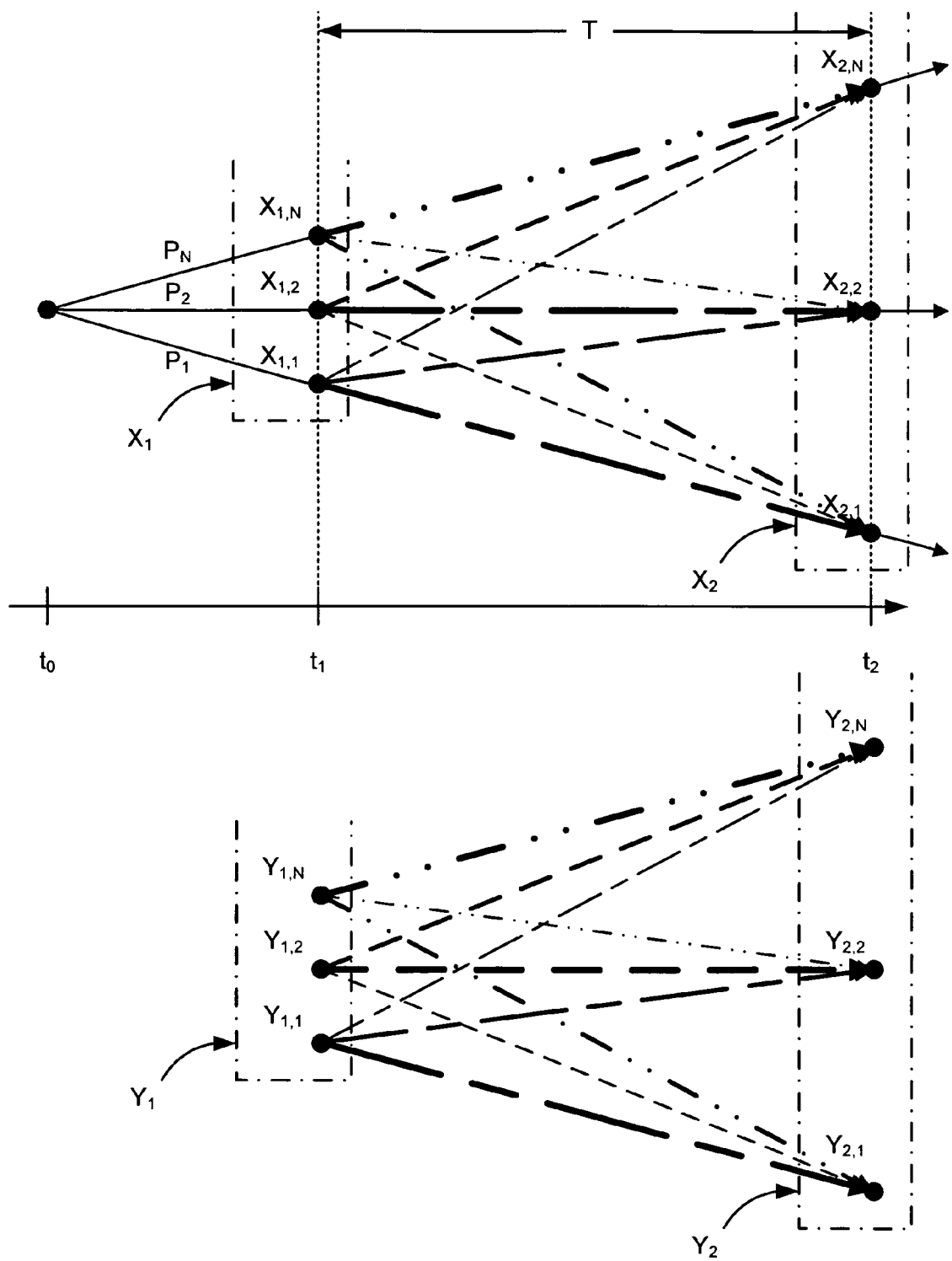
FIG. 6 is a diagram illustrating the use of a standard normal conditional distribution to determine a set of values of a first variable associated with a group of loans according to an exemplary embodiment.

Referring now to FIG. 6, the relationship between each standard normal conditional distribution and the probability of having any realization of a particular value in $X_2$ conditional on a particular realization $X_{1,k}$ in first distribution $X_1$ is illustrated. For example, the dashed lines between $Y_{1,1}$ and $Y_{2,1}$, $Y_{2,2}$, and $Y_{2,N}$ respectively indicate the conditional distribution of $Y_2$, given $Y_{1,1}$, and the weight of each dashed line represents the probability of a realization of a particular value of $Y_2$ conditional on $Y_1=Y_{1,1}$. Similar dashed lines are shown in FIG. 6 between $X_{1,1}$ and $X_{2,1}, X_{2,2}$, and $X_{2,N}$ respectively to indicate the corresponding probability of a realization of a particular value of $X_2$ conditional on $X_1=X_{1,1}$.

Because the probabilities are the same for first and second distributions $X_1$ and $X_2$, and first and second standard normal distributions $Y_1$ and $Y_2$, each of the conditional standard normal distributions $Y_2|y_{1,k}$ may be used to determine for each individual value $X_{1,k}$ in the first distribution $X_1$ one of the existing data paths $P_i$ from which to calculate a value of the first variable for predetermined time period T. More specifically, because there are corresponding values of first and second distributions $X_1$ and $X_2$, and first and second standard normal distributions $Y_1$ and $Y_2$ for each of the N statistical data paths $P_i$, each conditional standard normal distribution $Y_2|y_{1,k}$ may be used to determine the probability that for a given value of $X_{1,k}$ at $t_1$, the corresponding data path $P_{i=k}$ will "branch" into another of the predetermined data paths $P_{i=j}$ corresponding to $X_{2,j}$ at $t_2$. For example, the dashed line between $Y_{1,1}$ and $Y_{2,2}$ in FIG. 6 represents the probability that $Y_{2,2}$ will be realized at $t_2$ given $Y_{1,1}$ at $t_1$. Using Eq. (7), the corresponding dashed line between $X_{1,1}$ and $X_{2,2}$ represents the same probability that $X_{2,2}$ will be realized at $t_2$ given $X_{1,1}$ at $t_1$, and thus that given $X_{1,1}$ at $t_1$, $P_1$ will branch into $P_2$ over predetermined time period T. Thus, the probabilities contained in each conditional standard normal distribution $Y_2|y_{1,k}$ may be used to determine a particular predetermined statistical data path $P_i$ along which to calculate an individual value of the first variable corresponding to predetermined time period T for each predetermined data path $P_{i=k}$, given $X_{1,k}$ at $t_1$. For example, in a preferred embodiment, the first variable may be a future capital reserve requirement associated with a group of loans, the second variable X may be a net income associated with the group of loans, and each conditional standard normal distribution $Y_2|y_{1,k}$ may be used to determine the particular predetermined statistical data path $P_i$ corresponding to a stress loss of 99.5% of cumulative losses for each predetermined data path $P_{i=k}$ over the predetermined time period T, given a particular net income value $X_{1,k}$ at $t_1$. A future capital reserve requirement corresponding to predetermined time period T may then be calculated for each predetermined data path $P_{i=k}$.

Referring again to FIG. 1, at step 130 the economic risk associated with the first group of loans is estimated based on the set of values of the first variable associated with the group of loans. Steps 110 to 130 may be repeated as necessary to estimate economic risk associated with the group of loans for consecutive predetermined time periods T. For example, in one exemplary embodiment, steps 110 to 130 may be repeated in order to determine a set of future capital reserve requirements associated with a group of loans corresponding to years 2-11, and another set of future capital reserve requirements corresponding to years 3-12, and to estimate economic risk for each of these periods.

Figure 7:
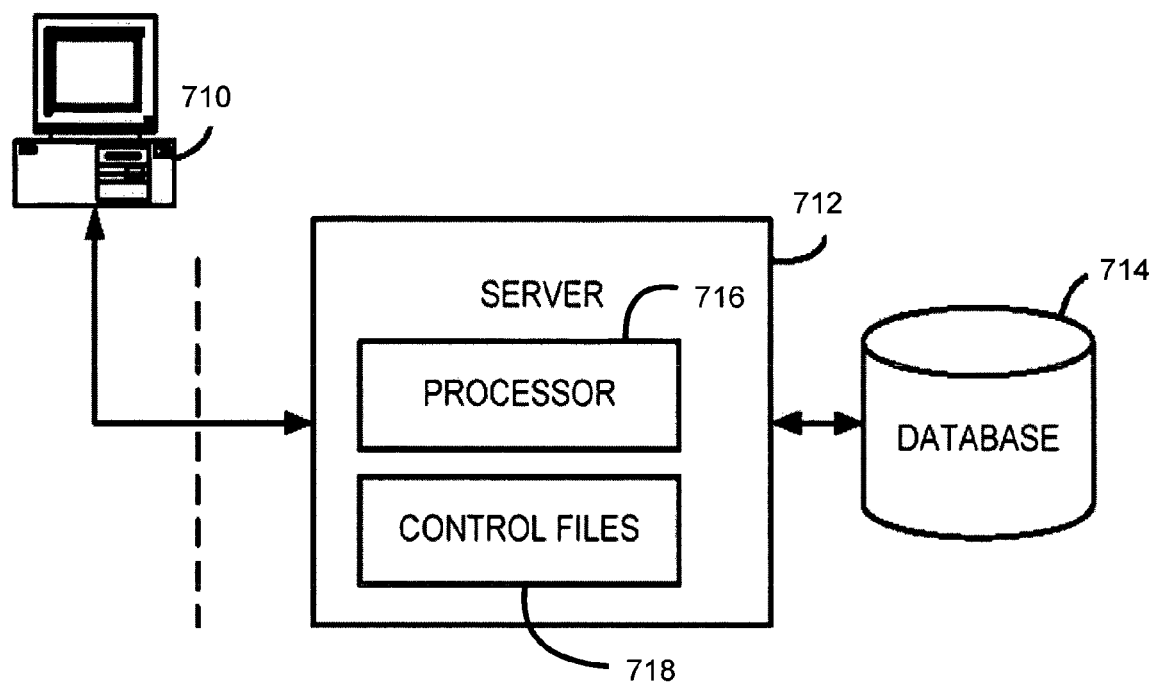
FIG. 7 is a block diagram of a system which may be used to determine a set of values of a first variable associated with a group of loans.

Referring now to FIG. 7, the methods and systems described herein may be embodied as programmed instructions and data and implemented, for example, on a computer 710, which may be communicatively coupled to a server system 712 and a database 714. Computer 710 may include a screen display and operator input device (e.g., keyboard), to allow data to be manipulated and to allow outputs to be viewed, stored, and communicated to other systems. Server system 712 may include a processor 716 and control files 718. Processor 716 may be operable to execute control files 718 and access data from database 714. Control files 718 may contain programmed instructions which embody one or more of the methods described herein. Loan data associated with a first group of loans and a second group of loans may be stored in a database 714 and accessed or downloaded from database 714 via server system 712 to be processed by processor 716 and stored in the computer 710 for operator analysis.

While the exemplary embodiments illustrated in the figures and described above are presently preferred, it should be understood that these embodiments are offered by way of example only. Many modifications are possible without materially departing from the novel teachings and advantages of the subject matter recited in the claims. Accordingly, all such modifications are intended to be included within the scope of the methods and systems described herein. The order or sequence of any process or method steps may be varied or re-sequenced according to alternative embodiments. Other substitutions, modifications, changes, and omissions may be made without departing from the spirit and scope of the methods and systems described herein.

What is claimed is:

1. A method, implemented via programmed instructions embodied on a computer-readable medium, for estimating economic risk associated with a group of loans according to a set of values of a first variable associated with the group of loans, wherein the first variable corresponds to a predetermined time period during the pendency of the group of loans, the method comprising:
   determining via a processor executing the programmed instructions, a statistical dependency structure between a predetermined first distribution of values of a second variable associated with the group of loans and a predetermined second distribution of values of the second variable associated with the group of loans, wherein the statistical dependency structure is based on a Gaussian copula function;
   determining via a processor executing the programmed instructions, the set of values of the first variable using the statistical dependency structure; and
   estimating via a processor executing the programmed instructions, the economic risk associated, with the group of loans based on the set of values of the first variable associated with the group of loans.

2. The method of claim 1, wherein each value in the first distribution of the second variable corresponds to a first time point prior to the predetermined time period, and each value in the second distribution of the second variable corresponds to a second time point after the predetermined time period.

3. The method of claim 2, wherein the first and second distributions are based on a number of previously generated statistical data paths representative of projected economic conditions during the pendency of the group of loans, and wherein each data path has a corresponding value of the second variable in the first distribution and in the second distribution.

4. The method of claim 3, wherein determining the statistical dependency structure comprises:
   transforming the second variable into a first uniform random variable using the first distribution and a second uniform random variable using the second distribution;
   transforming the first and second uniform random variables into corresponding first and second standard normal variables;
   determining a correlation parameter between the first standard normal variable and the second standard normal variable; and determining the Gaussian copula function, wherein the Gaussian copula function is a function of the first and second standard normal variables and the correlation parameter.

5. The method of claim 4, wherein determining the set of values of the first variable using the statistical dependency structure comprises:

determining a conditional standard normal distribution of values of the second standard normal variable for each value of the first standard normal variable using the Gaussian copula function, wherein each conditional standard normal distribution represents the probability that a particular value of the second standard normal variable will be realized given each value of the first standard normal variable; and using each of the conditional standard normal distributions of the second standard normal variable to determine the set of values of the first variable, wherein each individual value of the first variable corresponds to a particular data path.

6. The method of claim 1, wherein the first variable is a future capital reserve requirement.

7. The method of claim 1, wherein the second variable is a net cash flow.

8. The method of claim 1, wherein the first variable is a guaranty fee.

9. The method of claim 1, wherein the group of loans is a group of mortgage loans.

10. A computer implemented method for determining a set of future capital reserve requirements for a group of mortgage loans using a number of predetermined data paths representative of projected economic conditions during: the pendency of the group of mortgage loans, wherein the set of future capital reserve requirements corresponds to a predetermined time period during the pendency of the group of mortgage loans, the method, implemented via programmed instructions embodied on a computer-readable medium, comprising:

determining via a processor executing the programmed instructions, a statistical dependency structure between first and second distributions of net cash flow values for a group of loans based on a Gaussian copula function, the first distribution comprising individual net cash flow values corresponding to each predetermined data path at a first time prior to the predetermined time period, and the second distribution comprising individual net cash flow values corresponding to each predetermined data path at a second time after the predetermined time period; and determining via a processor executing the programmed instructions, the set of future capital reserve requirements from the statistical dependency structure.

11. The computer implemented method of claim 10, wherein determining the statistical dependency structure comprises:

transforming the first and second distributions into a first uniform random net cash flow variable and a second uniform random net cash flow variable using the second distribution;

transforming the first and second uniform random net cash flow variables into corresponding first and second standard normal net cash flow variables;

determining a correlation parameter between the first and second standard normal net cash flow variables; and determining the Gaussian copula function, wherein the Gaussian copula function is a function of the first and second standard normal net cash flow variables and the correlation parameter.

12. The computer implemented method of claim 11, wherein determining the set of future capital reserve requirements from the statistical dependency structure comprises:

determining a conditional standard normal distribution of values of the second standard normal net cash flow variable for each value of the first standard normal net cash flow variable using the Gaussian copula function, wherein each conditional standard normal distribution represents the probability that a particular value of the second standard normal net cash flow variable will be realized given each value of the first standard normal net cash flow variable; and using each of the conditional standard normal distributions of the second standard normal net cash flow variable to determine the set of future capital reserve requirements, wherein each individual capital reserve requirement corresponds to a particular data path.

13. The computer implemented method of claim 10, further comprising estimating via a processor executing the programmed instructions, economic risk associated with the group of mortgage loans using the set of future capital reserve requirements.

14. A system for determining a set of values of a first variable associated with a group of loans, wherein the set of values of the first variable corresponds to a predetermined time period during the pendency of the group of loans, the system comprising:

memory including a predetermined first distribution of values of a second variable associated with the group of loans and a predetermined second distribution of values of the second variable associated with the group of loans; and a processor coupled to the memory and operable to execute programmed instructions, wherein the programmed instructions:

(a) determine a statistical dependency structure between the predetermined first distribution of values of the second variable associated with the group of loans and the predetermined second distribution of values of the second variable associated with the group of loans, wherein the statistical dependency structure is based on a Gaussian copula function; and (b) determine the set of values of the first variable using the statistical dependency structure, whereby economic risk associated with the group of loans may be estimated based on the set of values of the first variable.

15. The system of claim 14, wherein each value in the first distribution of the second variable corresponds to a first time point prior to the predetermined time period, and each value in the second distribution of the second variable corresponds to a second time point after the predetermined time period.

16. The system of claim 15, wherein the first and second distributions are based on a number of previously generated statistical data paths representative of projected economic conditions during the pendency of the group of loans, and wherein each data path has a corresponding value of the second variable in the first distribution and in the second distribution.

17. The system of claim 16, wherein the programmed instructions determine the statistical dependency structure by:

transforming the second variable into a first uniform random variable using the first distribution and a second uniform random variable using the second distribution;

transforming the first and second uniform random variables into corresponding first and second standard normal variables;

determining a correlation parameter between the first standard normal variable and the second standard normal variable; and determining the Gaussian copula function, wherein the Gaussian copula function is a function of the first and second standard normal variables and the correlation parameter.

18. The system of claim 17, wherein the programmed instructions determine the set of values of the first variable using the statistical dependency structure by:

determining a conditional standard normal distribution of values of the second standard normal variable for each value of the first standard normal variable using the Gaussian copula function, wherein each conditional standard normal distribution represents the probability that a particular value of the second standard normal variable will be realized given each value of the first standard normal variable; and using each of the conditional standard normal distributions of the second standard normal variable to determine the set of values of the first variable, wherein each individual value of the first variable corresponds to a particular data path.

19. The system of claim 14, wherein the programmed instructions further estimate economic risk associated with the group of loans based on the set of values of the first variable associated with the group of loans.

20. The system of claim 14, wherein the first variable is a future capital reserve requirement.

21. The system of claim 14, wherein the second variable is a net cash flow.

22. The system of claim 14, wherein the first variable is a guaranty fee.

23. The system of claim 14, wherein the group of loans is a group of mortgage loans.

* * * * *

UNITED STATES PATENT AND TRADEMARK OFFICE
CERTIFICATE OF CORRECTION

PATENT NO. : 7,546,270 B1  
APPLICATION NO. : 11/138081  
DATED : June 9, 2009  
INVENTOR(S) : Caijiao J. Zhao Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 948 days.

Signed and Sealed this

Seventh Day of September, 2010

David J. Kappos  
*Director of the United States Patent and Trademark Office*